United States Patent Office 2,951,974
Patented Sept. 6, 1960

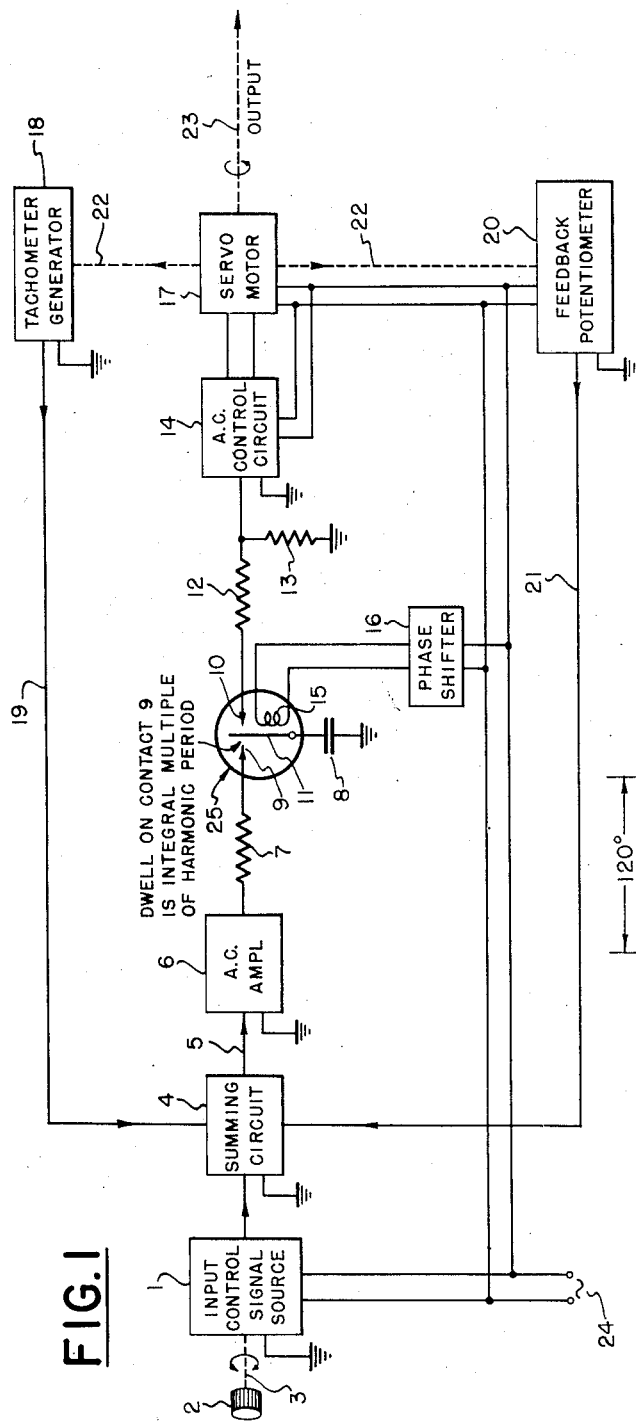
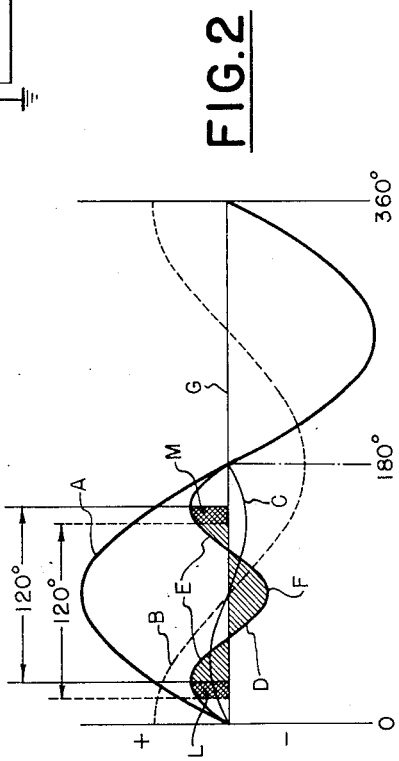

2,951,974

REJECTION OF HARMONICS IN SERVOMOTOR CONTROL SYSTEMS

Lawrence Silver, Forest Hills, N.Y., assignor to Sperry Rand Corporation, Great Neck, N.Y., a corporation of Delaware Filed Dec. 10, 1958, Ser. No. 779,462

6 Claims. (Cl. 318—28)

This invention relates to servomotor control systems of the type using A.-C. error signals and more particularly to means for eliminating unwanted quadrature and harmonic frequencies from such error signals.

In servomotor positioning loops of this type, which can be used in computing systems or for positioning systems, it is desirable that the resultant position of the servomotor be an accurate mechanical analog of the magnitude of the input control voltage. The conventional means for supplying an A.-C. control signal to a servo system of this type have inherent defects which cause the input control signal to contain spurious quadrature voltage and harmonic voltage components. The third harmonic and other higher order odd harmonics generally occur to a lesser extent in most A.-C. signal generation means. These added signals at other frequencies when present in the control signal will cause the servo to position itself inaccurately in order to supply sufficient feedback voltage to reduce the servomotor input error to zero.

It has been known in the prior art that the presence of quadrature component in the input control signal will cause servo positioning to a false null position and it has been therefore previously proposed to eliminate said quadrature voltage from the control signal. This has been done usually by the incorporation of a vibrating reed type chopper into the servomotor control circuit which would alternately connect the input control or error signal to an electrical storage device and then to the servomotor output device. For quadrature elimination the vibrating reed transfers at the same frequency as the fundamental frequency of the control signal and is required only to do this in phase with the fundamental frequency so that the total stored charge caused by the quadrature voltage during the charging portion of the cycle is substantially zero. Thus, when the reed is in its discharging position during the subsequent half cycle of the fundamental frequency none of the discharging current will be attributable to the quadrature voltage present during the charging half cycle because the total of the quadrature charge will be zero. This quadrature rejection technique has been used in the prior art with success without regard to the actual dwell time of the reed upon the chopper contacts during the storage device charging and discharging cycle, it having been found that proper phasing of this charging dwell time was the only requirement for substantial elimination of the quadrature voltage.

The present invention employs a similar structure and circuit as used in the prior art for quadrature rejection but in addition accomplishes harmonic voltage rejection. This is done by not only controlling the phase relation of the chopper vibration with respect to the error control signal but in addition controlling the chopper dwell time accurately so that the total charge on the electrical storage device due to an odd numbered harmonic is also reduced to zero. For third harmonic rejection the adjustment of the dwell time of the chopper reed should be one-third the period of the fundamental frequency, or in other words for 120 electrical degrees of the control frequency.

Similarly, it can be seen that with proper adjustment of the charging time of the storage device to some other value the net cancellation of other odd numbered harmonics may be accomplished without the sacrifice of the aforementioned feature of quadrature rejection taught by the prior art.

It is the object therefore of this invention to provide a servo positioning system wherein an accurate output position is obtained equivalent to the input signal free of quadrature and harmonic voltages.

Another object of this invention is to provide a chopper whose dwell time is adjusted to substantially eliminate third harmonic frequencies from a fundamental frequency.

It is another object of this invention to provide a means for eliminating quadrature, even numbered harmonics, and odd numbered harmonics of the carrier frequency by the control of the time dwell and phasing of a switching device.

It is a still further object of this invention to provide a highly accurate analog computer servo loop.

These and other objects will become apparent from a further description in connection with the accompanied drawings in which:

Figure 1 is a block diagram of a position servo system which includes a vibrating reed chopper for quadrature and harmonic voltage elimination.

Figure 2 is a graphical representation of the error voltage at the reference frequency in association with the quadrature and harmonic voltages present in said error signal.

Referring to Figure 1, a control signal source 1 is excited by for example a 400 cycle per second reference voltage excitation source 24. A control knob 2 is mechanically coupled through a connecting shaft 3 to the control signal source 1 to adjust the magnitude of the control signal which is fed to a signal summing circuit 4. The output of the summing circuit 4 is fed through a connecting wire 5 to an amplifier 6. The output of the summing circuit 4 is the resultant of the algebraic summation of the signals from the control signal source 1 and the signals on wires 19 and 21 from respectively a tachometer generator 18 and a position feedback potentiometer 20. The output of the amplifier 6 is fed through an input resistance 7 to a vibrating reed type chopper shown generally at 25. The reed of the chopper 25 is connected at its lower end to a capacitor 8. The upper end of the chopper reed 11 is made to vibrate by the magnetic field from a chopper excitation coil 15. The moving upper end of the reed 11 alternately contacts a chopper input contact 9 and a chopper output contact 10. A phase shifting device 16 is connected between the chopper excitation coil 15 and the A.-C. excitation source 24 so that the timing of the alternate positioning of the chopper reed 11 may be adjusted relative to the phase of the servo control signal appearing on contact 9.

The chopper output contact 10 is connected through a resistor 12 to the input of an A.-C. control circuit 14. The output of the A.-C. control circuit 14 is fed to a servomotor 17. Both the control circuit 14 and the servomotor 17 are excited by the source 24. The servomotor 17 is mechanically coupled through a shaft 22 to the tachometer generator 18 and the position feedback potentiometer 20, the latter of which is suitably excited also by the source 24. A servomotor output shaft 23 is rotatably positioned by the servomotor 17.

Figure 2 is a graphical representation of the waveforms of the components of the error signal on the wire 5. Curve A represents the in-phase component of the A.-C. error signal resulting from the summation of the inputs to the summing circuit 4. This signal in the described servo system is a 400 cycle per second sine wave. There will also be present on the summing circuit output wire 5 a quadrature component of the same frequency but 90° out of phase with the desired error signal, and harmonics of the error signal. These spurious signals which are present to a greater or lesser degree in most signal generation devices tend to cause a servomotor to drive to a false null position at which the resultant of the true error signal plus the spurious signals is a minimum. The curve B is a quadrature component of the error signal curve A. The curve C is the second harmonic of the error signal and passes through its minimum points at zero, 90°, 180°, and 270°. The curve D is representative of the third harmonic of the fundamental error signal curve A. The third harmonic and the quadrature voltage will usually be the predominant spurious signals present.

With particular reference to the curve D representing the third harmonic of the error signal it may be observed that the total area of the shaded sections E above the zero potential line D is equal to an area F, similarly shaded, below the zero potential line D. This shaded area of the third harmonic voltage curve D is contained within a 120° segment of the error signal period. This 120° segment is centrally located and in phase with the error signal curve A. The cross hatched areas L and M represent areas of the third harmonic voltage wave above the zero potential line D which are respectively gained and lost due to a phase displacement of the 120° segment from the in-phase position with respect to the carrier curve A.

From an inspection of the curves in Figure 2 with respect to the 120° portion which is centrally located in relation to the curve A, it can be observed that equal curve areas are enclosed not only of the third harmonic frequency but also of the second harmonic frequency curve C and the quadrature curve B.

In the operation of this invention the dwell time of the reed 11 upon the chopper contact 9 is made such that it approximates one-third the period of the reference frequency. During this time of contact between the reed 11 and the chopper contact 9 the charge upon the capacitor 8 builds up to an amplitude level which is determined only by the magnitude level of the in-phase component of the error control signal. This is true because the net sum of the charge induced upon the capacitor 8 by the quadrature, second harmonic, and the third harmonic voltage will always be zero when the dwell time of the reed 11 is for 120° and is in phase with the carrier frequency as shown in Figure 2. During the second half cycle of the reference frequency the polarity of the chopper excitation coil 15 will be reversed, causing the vibrating reed to transfer to the output contact 10. During the maintenance of this connection between the reed 11 and the chopper contact 10 the capacitive storage device 8 discharges through resistors 12 and 13 until the reed 11 is transferred back to the input chopper contact 9, at which time the charge and discharge cycle will repeat again. This alternate switching is adjusted to be in phase with the input error signal phase on the contact 9 by the phase shifter 16. Generally the time that the reed will be upon the chopper output contact 10 will be equal to the input charge time, although the time of this discharge cycle is unimportant for the operation of this invention.

The stored error input charge upon the capacitor 8 when discharged through the resistances 12 and 13 is the input to the A.-C. control circuit 14. This control circuit 14 may be a conventional magnetic amplifier wherein the output will be an approximate sine wave whose amplitude and phase are proportional to the input level and polarity of the voltage across the resistor 13. This A.-C. control circuit output is fed to an A.-C. phase sensitive reversible servomotor 17 which controls the rotational position of output shaft 23 and the connecting shafts 22 to the feedback potentiometer 20 and the tachometer generator 18. These latter two devices provide respectively output shaft position information and a servo damping term to the summing circuit 4.

The tachometer generator and position feedback signals are combined in the summing circuit 4 to oppose the input control signal. Until such time that the algebraic sum of the feedback voltages appearing on the wires 19 and 21 equals and opposes the signal from the control signal source 1 an input error signal will be present on wire 5 which in turn will be amplified by the A.-C. amplifier 6 and fed through resistor 7 to the chopper input contact 9. The error signal present on input contact 9 will be alternately stored and switched to the chopper output contact 10 and thereby fed to the A.-C. control circuit 14 to cause the servomotor 17 to drive a position such that the feedback potentiometer 20 generates a signal sufficient to oppose the signal from the control signal source 1 and reduce the in-phase error voltage signal on wire 5 to zero. Spurious voltages present on the chopper input contact 9 will be substantially cancelled during the storage cycle in the capacitor 8 so that although they are present on the input circuit to the left of the chopper 25, they will not affect the output position of the servomotor 17. Thus, through the effective cancellation of the quadrature, even numbered harmonics, and the third harmonic by the employment of a vibrating reed type chopper 25, the servomotor output shaft 23 is positioned in accordance with the carrier frequency control signal only, and is not affected by harmonic voltages which are inherent in the control signal source or which may be generated in any of the circuit components.

It can be seen that with proper variation of the dwell time to some other proportion of the carrier frequency period, optimized cancellation may be obtained of higher numbered odd harmonics while maintaining all of the previously obtained quadrature and even number harmonic cancellation. For instance, if it were desirable to cancel the fifth harmonic of the carrier frequency it would be necessary that the time dwell of the vibrating reed 11 upon the contact 9 be of a time equal to an integral multiple of the period of the fifth harmonic, which in this case would be equal to a dwell angle of 72 or 144 degrees. Either of these two angles will produce a zero net charge on the storage capacitance 8 caused by the fifth harmonic. For the reason that the third harmonic will generally also be present it would be preferable to adjust the dwell angle to 144 degrees rather than to 72 degrees to effect better cancellation of the third harmonic.

Many other embodiments could be made of this same general invention, for instance, in lieu of a vibrating reed type switch an electronic equivalent could be used for accomplishing the alternate connection of said storage means. This invention could also be applied to a system other than a position servo system, for instance, to an analog computing device which requires an output position in proportion to many input control signals, or to a velocity type servo system wherein the rate at which a servomotor runs is proportional to the error signal applied. Because many changes could be made in the above construction as described and many different embodiments could be conceived employing the same invention, it is intended that all matter in the above description and drawings be illustrative only and not interpreted in a limiting sense.

What is claimed is:

1. A servomotor control system including means for supplying an A.-C. input error signal, a servomotor, an electrical storage device, means for connecting said storage device to said error signal supply means during alternate half cycles of said error signal voltage and for connecting said storage means to said servomotor during the other alternate half cycles of said error signal voltage, said alternate connection of said storage means to said error signal supply means and to said servomotor being synchronous with said error signal and of a time duration in the first mentioned of said connections substantially equal to an integral multiple, including one, of the period of an odd numbered harmonic frequency present in said input error signal.

2. A servomotor control system including means for supplying an input error signal at a reference frequency, a servomotor, an electrical storage device, switching means operated at said reference frequency for alternately connecting said storage device to said error signal supply means during each first half cycle of said control signal voltage and for connecting said storage means to said servomotor during each second half cycle of said control signal voltage, said alternate connection of said storage means to said error signal supply means and to said servomotor being a time duration in the first mentioned of said connections equal substantially to an integral multiple of the period of an odd harmonic of said reference frequency.

3. Apparatus as in claim 2 wherein said switching means is a vibrating reed type chopper and said switch operation means includes a phase shift device for adjusting the phase relation of the vibrating reed with respect to the input error signal phase.

4. Apparatus as in claim 2 wherein said electrical storage device is a capacitor.

5. In a servomotor control system including means for supplying an input control signal at a reference frequency and a servomotor responsive to said control signal, apparatus for eliminating quadrature and harmonic components of said control signal, said apparatus including a two position vibrating reed type switch and an electrical storage device, said reed being excited at a reference frequency causing the alternate connection of said electrical storage device to said control signal supply means and to said servomotor, said alternate connection of said storage device to said signal supply means and to said servomotor being in timed relation with the control signal reference frequency and of a time duration in said control signal supply connection substantially equal to one third of the reference frequency period, to provide maximum cancellation in the electrical storage device of the third harmonic.

6. A servomotor control system including means for supplying an input control signal at a reference frequency, a servomotor responsive to said control signal, quadrature and harmonic voltage elimination means, said elimination means including a two position vibrating reed type switch and an electrical storage device, said reed being excited at a reference frequency causing the alternate connection of said electrical storage device to said control signal supply means and to said servomotor, said alternate connection of said storage device to said signal supply means and to said servomotor being in timed relation with the control signal reference frequency and of a time duration in said control signal supply connection equal to an integral multiple, including one, of the period of an odd numbered harmonic frequency present in said input control signal to provide maximum cancellation of said harmonic frequency.

References Cited in the file of this patent

UNITED STATES PATENTS 2,832,020    Towner _____ Apr. 22, 1958